United States Patent
Halasa et al.

(10) Patent No.: US 7,091,150 B2
(45) Date of Patent: Aug. 15, 2006

(54) SYNTHETIC POLYISOPRENE RUBBER

(75) Inventors: Adel Farhan Halasa, Bath, OH (US); Wen-Liang Hsu, Cuyahoga Falls, OH (US); Aaron Michael Ryba, Akron, OH (US); Jin-Ping Zhou, Akron, OH (US); Chad Aaron Jasiunas, Copley, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 125 days.

(21) Appl. No.: 10/942,517

(22) Filed: Sep. 16, 2004

(65) Prior Publication Data

US 2005/0137338 A1    Jun. 23, 2005

Related U.S. Application Data

(60) Provisional application No. 60/531,040, filed on Dec. 19, 2003.

(51) Int. Cl.
*B01J 31/04* (2006.01)
*B01J 37/04* (2006.01)

(52) U.S. Cl. .............. 502/134; 502/103; 502/132; 526/335; 526/154

(58) Field of Classification Search .......... 502/103, 502/132, 134; 526/335, 154; 524/525, 534, 524/526
See application file for complete search history.

(56) References Cited

U.S. PATENT DOCUMENTS

| | | | | |
|---|---|---|---|---|
| 3,297,667 A | 1/1967 | Von Dohlen et al. | ....... | 526/160 |
| 3,676,441 A | 7/1972 | Nikles | ....... | 260/249.8 |
| 3,794,604 A | 2/1974 | Throckmorton et al. | .... | 502/123 |
| 4,242,232 A | 12/1980 | Sylvester et al. | ........ | 502/102 |
| 4,260,707 A | 4/1981 | Sylvester et al. | ........ | 526/114 |
| 4,429,089 A | 1/1984 | Pedretti et al. | ........ | 526/153 |
| 4,444,903 A | 4/1984 | Carbonaro et al. | ........ | 502/102 |
| 4,461,883 A * | 7/1984 | Takeuchi et al. | ........ | 526/139 |
| 4,533,711 A | 8/1985 | Takeuchi et al. | ...... | 526/340.04 |
| 4,663,405 A | 5/1987 | Throckmorton | ........ | 526/144 |
| 4,699,960 A * | 10/1987 | Gordini et al. | ........ | 526/81 |
| 5,502,126 A | 3/1996 | Bell et al. | ........ | 526/142 |
| 5,659,101 A | 8/1997 | Biagini et al. | ........ | 585/601 |
| 5,686,371 A | 11/1997 | Ansell et al. | ........ | 502/102 |
| 6,136,931 A | 10/2000 | Jang et al. | ........ | 526/133 |
| 6,255,416 B1 | 7/2001 | Sone et al. | ........ | 526/153 |
| 6,699,813 B1 * | 3/2004 | Luo et al. | ........ | 502/119 |
| 2004/0116638 A1 * | 6/2004 | Ozawa et al. | ........ | 526/335 |

OTHER PUBLICATIONS

R. P. Quirk, A. M. Kells, K. Yunlu, J.P. Cuif, *Polymer* 41, 5903 (2000).
A. Pross, P. Marquardt, K. H. Reichert, W. Nentwig, T. Knauf, *Angew. Makromol. Chem.* 211, 89 (1993).
H. Iovu, G. Hubca, E. Simionescu, E. Badea, J. S. Hurst, *Eur. Polymer J.* 33, 811 (1997).
H. Iovu, G. Hubca, D. Racoti, J. S. Hurst, *Eur. Polymer J.* 35, 335 (1999).
J. H. Yang, M. Tsutsui, Z. Chen, D. Bergbreiter, *Macromolecules* 15, 230 (1982).
D. J. Wilson, *J. Polym. Sci., Part A*. 33, 2505 (1995).

* cited by examiner

*Primary Examiner*—Ling-Sui Choi
(74) *Attorney, Agent, or Firm*—Alvin T. Rockhill

(57) ABSTRACT

The neodymium catalyst system prepared by the technique of this invention can be used in the polymerization of isoprene monomer into synthetic polyisoprene rubber having an extremely high cis-microstructure content and high stereo regularity. This polyisoprene rubber will crystallize under strain and can be compounded into rubber formulations in a manner similar to natural rubber. This invention more specifically discloses a process for preparing a neodymium catalyst system which comprises (1) reacting a neodymium carboxylate with an organoaluminum compound in an organic solvent to produce neodymium-aluminum catalyst component, and (2) subsequently reacting the neodymium-aluminum catalyst component with an elemental halogen to produce the neodymium catalyst system. The present invention further discloses a synthetic polyisoprene rubber which is comprised of repeat units that are derived from isoprene, wherein the synthetic polyisoprene rubber has a cis-microstructure content which is within the range of 98.0% to 99.5%, a 3,4-microstructure content which is within the range of 0.5% to 2.0%, and a trans-microstructure content which is within the range of 0.0% to 0.5%.

17 Claims, No Drawings

SYNTHETIC POLYISOPRENE RUBBER

This application claims the benefit of U.S. Provisional Patent Application Ser. No. 60/531,040, filed on Dec. 19, 2003.

BACKGROUND OF THE INVENTION

Neodymium salts activated with aluminum alkyl co-catalysts have been known to catalyze the polymerization of conjugated dienes since the early 1960's. To date, many papers and patents have been published which describe variations and improvements to the original systems (see U.S. Pat. No. 3,297,667, U.S. Pat. No. 3,676,441, and U.S. Pat. No. 3,794,604). Much of this work was driven by the eventual commercialization of high cis-polybutadiene in the 1980s for the use in tire applications (see U.S. Pat. No. 4,242,232, U.S. Pat. No. 4,260,707, U.S. Pat. No. 4,699,960, and U.S. Pat. No. 4,444,903).

The type of catalyst system employed and its method of preparation are crucial to the success of the polymerization. Traditionally, there are two main types of catalyst systems, the first is a ternary system based on soluble neodymium carboxylates in conjunction with an alkylaluminum co-catalyst and a halogen source (see R. P. Quirk, A. M. Kells, K. Yunlu, J. P. Cuif, *Polymer* 41, 5903 (2000) and A. Pross, P. Marquardt, K. H. Reichert, W. Nentwig, T. Knauf, *Angew. Makromol. Chem.* 211, 89 (1993)). The second system is a binary catalyst comprising of an insoluble neodymium halide complexed with three equivalence of a Lewis base such as an alcohol, amine, or phosphonate and an alkylaluminum activator (see H. Iovu, G. Hubca, E. Simionescu, E. Badea, J. S. Hurst, *Eur. Polymer J.* 33, 811 (1997); H. Iovu, G. Hubca, D. Racoti, J. S. Hurst, *Eur. Polymer J.* 35, 335 (1999); and J. H. Yang, M. Tsutsui, Z. Chen, D. Bergbreiter, *Macromolecules* 15, 230 (1982)).

In general, the two systems behave similarly; however, the ternary system appears to have gained acceptance commercially in the production of polybutadiene (see D. J. Wilson, *J. Polym. Sci., Part A.* 33, 2505 (1995)). Typically, the most active ternary systems consist of treating a branched long chain neodymium carboxylate with branched trialkyl-aluminum or dialkylaluminum hydrides, in an Al/Nd ratio between 10–40/1, and the use of 2–3 equivalents of a halide source, such as diethylaluminum chloride or tert-butylchloride.

The active catalyst is typically prepared in one of two ways. The simplest method is to generate the catalyst in-situ by sequentially introducing the catalyst components to the polymerization solution. It is usually most effective to introduce the aluminum alkyl components first, thereby scavenging impurities from the premix prior to contact with the neodymium salt. The other method for catalyst preparation is to preform the catalyst components prior to introducing them into the polymerization vessel. The most common practice involves sequentially treating the catalyst components in the presence of at least a few equivalents of monomer followed by an aging period. For example U.S. Pat. No. 3,794,604 discloses an improved preforming technique which is carried out in the presence of a small portion of a conjugated diene.

Aging the catalyst components with a diene prior to polymerization results in a more active catalyst then when the conjugated diene is absent. The disclosed technique for catalyst formation is to age after all of the components have been mixed together. U.S. Pat. No. 4,429,089 also teaches the use of a diolefin during catalyst formation and states that the particular procedure which is followed has no bearing on the polymerization run. Likewise, U.S. Pat. No. 4,461,883 discloses that the use of a conjugated diene in the catalyst make-up is preferable for improving the activity of the catalyst. In this example, the diene is mixed with the catalyst components at any time in the preforming step with aging occurring after all components are mixed together.

U.S. Pat. No. 4,533,711 teaches the practice of adding the catalyst components together first followed by the addition of a small amount of diene and then aging the preformed catalyst. This patent states that the diene is not essential in the make-up but it does serve to increase catalyst activity. U.S. Pat. No. 4,663,405 continues to teach the use of conjugated dienes as components in preformed catalysts. It goes on to state that soluble catalysts result when diolefins are present in the make-up while insoluble catalysts frequently result when no diene is present. This patent teaches a process where aging of the catalyst occurs after the reagents are added.

U.S. Pat. No. 5,502,126 again practices the use of a diene in the preformed catalyst make-up and again states that it is preferred to age the catalyst after the labile halogen compound is added. In U.S. Pat. No. 5,659,101 the use of a diolefin in conjunction with a boron derived halogen source results in a preformed catalyst that partially forms a solid precipitate in aliphatic solvents.

When silicone halides are used, as in U.S. Pat. No. 5,686,371, aging in the presence of a diene again is performed after the addition of all the catalyst components. U.S. Pat. No. 6,136,931 discloses an improved boron halide dependent preformed catalyst that has excellent solubility in non-polar solvents. Finally, U.S. Pat. No. 6,255,416 also practice preformed catalyst generation in the presence of a small amount of diene. Aging in this case again occurs after all of the catalyst components are mixed.

SUMMARY OF THE INVENTION

The neodymium catalyst system prepared by the technique of this invention can be used in the polymerization of isoprene monomer into synthetic polyisoprene rubber having an extremely high cis-microstructure content and high stereo regularity. This polyisoprene rubber will crystallize under strain and can be compounded into rubber formulations in a manner similar to natural rubber. It can accordingly be utilized in manufacturing a wide variety of rubber articles, such as tires, hoses, and belts.

This invention more specifically discloses a process for preparing a neodymium catalyst system which comprises (1) reacting a neodymium carboxylate with an organoaluminum compound in an organic solvent to produce neodymium-aluminum catalyst component, and (2) subsequently reacting the neodymium-aluminum catalyst component with an elemental halide to produce the neodymium catalyst system.

The subject invention further reveals a process for the synthesis of polyisoprene rubber which comprises polymerizing isoprene monomer in the presence of a neodymium catalyst system, wherein the neodymium catalyst system is prepared by (1) reacting a neodymium carboxylate with an organoaluminum compound in an organic solvent to produce neodymium-aluminum catalyst component, and (2) subsequently reacting the neodymium-aluminum catalyst component with an elemental halogen to produce the neodymium catalyst system.

The present invention also discloses a synthetic polyisoprene rubber which is comprised of repeat units that are derived from isoprene, wherein the synthetic polyisoprene rubber has a cis-microstructure content which is within the range of 98.0% to 99.5%, a 3,4-microstructure content which is within the range of 0.5% to 2.0%, and a trans-microstructure content which is within the range of 0.0% to 0.5%.

The present invention further reveals a pneumatic tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of (1) a synthetic rubber which is comprised of repeat units that are derived from isoprene, wherein the synthetic polyisoprene rubber has a cis-microstructure content which is within the range of 98.0% to 99.5%, a 3,4-microstructure content which is within the range of 0.5% to 2.0%, and a trans-microstructure content which is within the range of 0.0% to 0.5%, and (2) at least one rubbery polymer selected from the group consisting of natural rubber, polybutadiene rubber, styrene-butadiene rubber.

DETAILED DESCRIPTION OF THE INVENTION

The neodymium catalyst system of this invention can be used in the polymerization of isoprene monomer into polyisoprene rubber that will crystallize under strain. Such polymerizations are typically conducted in a hydrocarbon solvent that can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In solution polymerizations that utilize the catalyst systems of this invention, there will normally be from 5 to 35 weight percent isoprene monomer in the polymerization medium. Such polymerization mediums are, of course, comprised of an organic solvent, the isoprene monomer, and the catalyst system. In most cases, it will be preferred for the polymerization medium to contain from 10 weight percent to 30 weight percent isoprene monomer. It is generally more preferred for the polymerization medium to contain 12 weight percent to 18 weight percent isoprene monomer.

The neodymium catalyst system used in the process of this invention is made by (1) reacting a neodymium carboxylate with an organoaluminum compound in an organic solvent to produce neodymium-aluminum catalyst component, and (2) subsequently reacting the neodymium-aluminum catalyst component with an elemental halogen to produce the neodymium catalyst system. In making the neodymium catalyst system the neodymium carboxylate and the organoaluminum compound are first reacted together for a period of 1 minute to about 10 hours to make the neodymium-aluminum catalyst component. The neodymium carboxylate and the organoaluminum compound are preferable reacted for a period of 10 minutes to 45 minutes. This step can be conducted over a wide temperature range of from about 0° to about 150° C. The neodymium carboxylate and the organoaluminum compound will more typically be reacted at a temperature which is within the range of 5° C. to about 105° C., and will preferable be conducted at a temperature which is within the range of 55° C. to about 85° C.

The neodymium-aluminum catalyst component is then reacted with at least one elemental halogen of Group VII of the Periodic Table. The elemental halogen will be selected from fluorine, chlorine, bromine, iodine, astatine, and any mixed halogen compounds such as iodine monochloride or iodine bromide. It is preferred to utilize fluorine, chlorine, or bromine as the elemental halogen. Fluorine and chlorine are preferred with chlorine being most preferred. A mixture of elemental halogens can be employed in the practice of the process of this invention. For instance, a mixture of fluorine and chlorine can be utilized as the elemental halogen.

The elemental halogen is reacted with the neodymium-aluminum component by simply introducing the halogen into an organic solution of the neodymium-aluminum component. For instance, this can be accomplished by bubbling fluorine or chlorine gas through a solution of the neodymium-aluminum component in an organic solvent. However, it is preferred to react the neodymium-aluminum component with an elemental halogen which is pre-dissolved in an organic solvent. Such a solution containing elemental halogen can be prepared by bubbling fluorine or chlorine gas through an organic solvent. These organic solvents normally contain from 4 to 10 carbon atoms per molecule as defined previously. The concentration of these halogen solutions is normally ranged from 0.05 to 2 M. This will normally be done at a temperature that is within the range of −10° C. to 80° C., and will preferably be done at a temperature that is within the range of 5° C. to 50° C. The elemental halogen will generally be reacted with the neodymium-aluminum component at room temperature (about 10° C. to about 30° C.).

The organoaluminum compound contains at least one carbon to aluminum bond and can be represented by the structural formula:

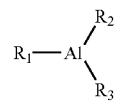

in which $R_1$ is selected from the group consisting of alkyl (including cycloalkyl), alkoxy, aryl, alkaryl, arylalkyl radicals and hydrogen: $R_2$ is selected from the group consisting of alkyl (including cycloalkyl), aryl, alkaryl, arylalkyl radicals and hydrogen and $R_3$ is selected from a group consisting of alkyl (including cycloalkyl), aryl, alkaryl and arylalkyl radicals. Representative of the compounds corresponding to this definition are: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-propylaluminum, triisopropylaluminim, tri-n-butylaluminum, tri-isobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

The neodymium carboxylate utilizes an organic monocarboxylic acid ligand that contains from 1 to 20 carbon atoms, such as acetic acid, propionic acid, valeric acid, hexanoic acid, 2-ethylhexanoic acid, neodecanoic acid, lauric acid, stearic acid and the like neodymium naphthenate, neodymium neodecanoate, neodymium octanoate, and other neodymium metal complexes with carboxylic acid containing ligands containing from 1 to 20 carbon atoms.

The proportions of the catalyst components utilized in making the neodymium catalyst system of this invention can be varied widely. The molar ratio of the trialkylaluminum or alkylaluminum hydride to neodymium metal can range from about 4/1 to about 200/1 with the most preferred range being from about 8/1 to about 100/1. Although, optionally, a small amount of diene monomer can be added to the catalyst system as described in previous patents and literature, it was found that the neodymium catalyst system disclosed in this invention is totally soluble in organic solvent and stable at ambient temperature without the use of such diene monomers.

The molar ratio of the elemental halogen to the neodymium compound will typically be within the range of 0.1:1 to about 5:1. The molar ratio of the elemental halogen to the neodymium carboxylate will preferably be within the range of 0.5:1 to about 2:1. The molar ratio of the elemental halogen to the neodymium carboxylate will most preferably be within the range of 0.3:1 to about 1.5:1.

The amount of catalyst used to initiate the polymerization can be varied over a wide range. Low concentrations of the catalyst system are normally desirable in order to minimize ash problems. It has been found that polymerizations will occur when the catalyst level of the neodymium metal is 0.03 or more millimole of neodymium metal per 100 grams of monomer. A preferred ratio is between 0.05 and 0.3 millimole of neodymium metal per 100 grams of monomer.

The concentration of the total catalyst system employed, of course, depends upon factors such as purity of the system, polymerization rate desired, temperature and other factors. Therefore, specific concentrations cannot be set forth except to say that catalytic amounts are used.

Temperatures at which the polymerization reaction is carried out can be varied over a wide range. Usually the temperature can be varied from extremely low temperatures such as −60° C. up to high temperatures, such as 150° C. or higher. Thus, the temperature is not a critical factor of the invention. It is generally preferred, however, to conduct the reaction at a temperature in the range of from about 10° C. to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

The polymerization can be terminated by the addition of an alcohol or another protic source, such as water. Such a termination step results in the formation of a protic acid. However, it has been unexpectedly found that better color can be attained by utilizing an alkaline aqueous neutralizer solution to terminate the polymerization. Another advantage of using an alkaline aqueous neutralizer solution to terminate the polymerization is that no residual organic materials are added to the polymeric product.

Polymerization can be terminated by simply adding an alkaline aqueous neutralizer solution to the polymer cement. The amount of alkaline aqueous neutralizer solution added will typically be within the range of about 1 weight percent to about 50 weight percent based upon the weight of the polyisoprene cement. More typically, the amount of the alkaline aqueous neutralizer solution added will be within the range of about 4 weight percent to about 35 weight percent based upon the weight of the polyisoprene cement. Preferable, the amount of the alkaline aqueous neutralizer solution added will be within the range of about 5 weight percent to about 15 weight percent based upon the weight of the polyisoprene cement.

The alkaline aqueous neutralizer solution will typically have a pH which is within the range of 7.1 to 9.5. The alkaline aqueous neutralizer solution will more typically have a pH which is within the range of 7.5 to 9.0, and will preferable have a pH that is within the range of 8.0 to 8.5. The alkaline aqueous neutralizer solution will generally be a solution of an inorganic base, such as a sodium carbonate, a potassium carbonate, a sodium bicarbonate, a potassium bicarbonate, a sodium phosphate, a potassium phosphate, and the like. For instance, the alkaline aqueous neutralizer solution can be a 0.25 weight percent solution of sodium bicarbonate in water. Since the alkaline aqueous neutralizer solution is not soluble with the polymer cement it is important to utilize a significant level of agitation to mix the alkaline aqueous neutralizer solution into throughout the polymer cement to terminate the polymerization. Since the alkaline aqueous neutralizer solution is not soluble in the polymer cement it will readily separate after agitation is discontinued.

The synthetic polyisoprene rubber made with the unique neodymium catalyst system of this invention is comprised of repeat units that are derived from isoprene (isoprene repeat units), wherein the synthetic polyisoprene rubber has a cis-microstructure content which is within the range of 98.0% to 99.5%, a 3,4-microstructure content which is within the range of 0.5% to 2.0%, and a trans-microstructure content which is within the range of 0.0% to 0.5%. The synthetic polyisoprene rubber will have a ratio of weight average molecular weight to the number average molecular weight that is within the range of 1.0 to 2.5. The synthetic polyisoprene rubber will preferably have a ratio of weight average molecular weight to the number average molecular weight which is within the range of 1.25 to 2.15.

The synthetic polyisoprene rubber made with the novel neodymium catalyst system of this invention has a stereo regularity of at least 99.0% and preferably has a stereo regularity of at least 99.5%. In other words, at least 99.0% and preferably 99.5 of the isoprene repeat units in the backbone of the polymer chain are bound "head to tail" with less than 1% of the isoprene repeat units being connected "tail to tail" and/or "head to head."

The synthetic polyisoprene made with the catalyst system of this invention will crystallize under strain and has properties that are similar to natural rubber. It can accordingly be used as a partial or direct replacement for natural rubber in a wide variety of applications, such as tires, hoses, and belts. It can also be blended with natural rubber or synthetic rubber, such as high-cis-1,4-polybutadiene, styrene-butadiene rubber (made by solution or emulsion polymerization), or isoprene-butadiene rubber, for utilization in such applications. It has characteristics that are particularly useful in manufacturing rubber compositions for tire treads.

The neodymium catalyst system of this invention can also be used in the polymerization of other conjugated diene monomers such as 1,3-butadiene, 2,3-dimethyl-1,3-butadiene, 1,3-pentadiene, 4-methyl-1,3-pentadiene, 1,3-cyclohexadiene and mixtures of these conjugated diene monomers, such as isoprene/1,3-butadiene, and isoprene/1,3-pentadiene.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

The preparation of an alkylated neodymium catalyst is described in this example. In the procedure used, 20 milliliters of a 0.506 M neodymium neodecanoate ($NdV_3$) solution in hexanes was charged to a dried 8 oz (237 ml.) bottle under nitrogen at room temperature. Then, 142 ml. of 1M tri-n-octyl aluminum (TOA) in hexanes (the hexanes solvent used was a mixture of various hexane isomers) was slowly added to above $NdV_3$ solution. The resulting light blue mixture was then heated in a rotating polymerization bath at 70° C. for 10 to 60 minutes. The molar ratio of TOA to Nd was 14:1. The solution turned darker brown color in less than 10 minutes. The concentration of this Nd catalyst was 0.063 M. Other alkylated Nd catalysts were prepared similarly with tri-ethylaluminum (TEA), tri-isobutyl aluminum (TIBA), di-isobutylaluminum hydride (DIBAH) and tri-n-hexyl aluminum (THA). All alkylated Nd catalysts were soluble in hexanes solvent. These alkylated Nd catalysts can be prepared in a heated loop or a mixer outside of a polymerization reactor prior to use as the co-catalyst for polymerization in a batch or a continuous systems.

EXAMPLE 2

In this example, an active preformed neodymium catalyst was prepared. 0.47 ml of a neat t-amyl chloride (t-AmCl, 7.96 M) was added dropwise, with shaking, to a 4 oz (118 ml.) bottle containing 30 ml. of a pre-alkylated Nd catalyst (0.063 M as described in Example 1) at room temperature. A vigorous reaction took place. The resulting light brown mixture was used for polymerizing isoprene 1,3-butadiene or a mixture of 1,3-butadiene and isoprene. The molar ratio of Nd to TOA and to t-AmCl were 1:14:2.

EXAMPLE 3

In this experiment, a polyisoprene was prepared using a preformed Nd catalyst as described in Example 2. In the procedure used 2000 grams of a silica/alumina/molecular sieve dried premix containing 19.90 weight percent isoprene in hexanes was charged into a one-gallon (3.8 liter) reactor. Then, 14.1 ml of a preformed Nd catalyst made by the procedure described in Example 2 was added to the reactor. The amount of Nd used was 0.22 mmole per 100 grams of isoprene monomer.

The polymerization was carried out at 90° C. The GC analysis of the residual monomer contained in the polymerization mixture indicated that the 90% of isoprene monomer was consumed after 14 minutes. The polymerization was continued for an additional 30 minutes. Then, 1 ml. of neat ethanol was added to shortstop the polymerization. The polymer cement was then removed from the reactor and stabilized with 1 phm of antioxidant. After evaporating hexanes, the resulting polymer was dried in a vacuum oven at 50° C.

The polyisoprene produced was determined to have a glass transition temperature (Tg) at −67° C. It was then determined to have a microstructure, which contained 95.6 percent cis-1,4-polyisoprene units, 1.4 percent trans-1,4-polyisoprene units, and 3.0 percent 3,4-polyisoprene units. The Mooney viscosity (ML-4) at 100° C. for this polymer was determined to be 82. This polymer was also determined to have a stereo regularity count (head to tail) of 99.6%. The GPC measurements indicated that the polymer has a number average molecular weight (Mn) of 429,000 and a weight average molecular weight (Mw) of 1,032,000. The polydispersity (Mw/Mn) of the resulting polymer was determined to be 2.41.

COMPARATIVE EXAMPLE 4

In this example, a polyisoprene was prepared using a pre-alkylated Nd catalyst as described in Example 1 and the co-catalyst t-AmCl was added separately to the reactor containing isoprene monomer. The procedure described in Example 3 was utilized in this example except that a pre-alkylated Nd catalyst (as described in Example 1) was used as the co-catalyst and, 1.75 ml of a 1M solution of t-AmCl (in hexane) was subsequently added to the reactor containing isoprene premix in the reactor. The GC analysis of the residual monomer contained in the polymerization mixture indicated that 90 percent of isoprene was consumed after 350 minutes at 90° C. The polymerization was continued for an additional 30 minutes. The polymer was then recovered as described in Example 3. The resulting polymer had a glass transition temperature (Tg) at −67° C. It was also determined to have a Mooney viscosity (ML-4) at 100° C. of 72. The GPC measurements indicated that the polymer has a number average molecular weight (Mn) of 476,000 and a weight average molecular weight (Mw) of 1,182,000. The polydispersity (Mw/Mn) of the resulting polymer was 2.48. A rate and polymer characteristics comparison of the polyisoprenes prepared using Nd catalysts described in Examples 1 and 2 are tabulated in Table 1.

TABLE 1

| Example No | Catalyst | Time to 90% conversion (min.) | Tg (° C.) | ML-4 | Molecular weight by GPC | | |
|---|---|---|---|---|---|---|---|
| | | | | | Mn | Mw | Mw/Mn |
| 3 | Preformed Nd with t-AmCl | 14 | −67 | 82 | 429K | 1,032K | 2.41 |
| 4 | Pre-alkylated Nd with t-AmCl added separately | 350 | −67 | 72 | 476K | 1,182K | 2.48 |

EXAMPLE 5

In this experiment, a 30/70 isoprene-butadiene rubber (IBR) was prepared using a preformed catalyst described in Example 2. The procedure described in Example 3 was utilized in this examples except that a premix containing a 30:70 mixture of isoprene and 1,3-butadiene was used as the monomers. GC analysis of the residual monomer indicated that 90 percent of monomers were consumed after 9 minutes. The polymerization was continued for an additional 21 minutes.

The resulting IBR was then recovered as described in Example 3. It was determined to have a glass transition temperatures at −102° C. The Mooney viscosity (ML-4) at 100° C. for this polymer was determined to be 102. It was then determined to have a microstructure which contained 67.7 percent cis-1,4-polybutadiene units, 1.4 percent trans-1,4-polybutadiene units, 0.8 percent 1,2-polybutadiene unit, 28.9 percent cis-1,4-polyisoprene units, 0.3 percent trans-1,4-polyisoprene unit, and 0.9 percent 3,4-polyisoprene unit. The GPC measurements indicated that the IBRs has a number average molecular weight (Mn) of 427,000 and a weight average molecular weight (Mw) of 1,029,000. The polydispersity (Mw/Mn) of the resulting polymer was 2.14.

COMPARATIVE EXAMPLE 6

In this example, a 30/70 IBR was prepared using the procedure described in Example 4 except that a premix containing a 30:70 mixture of isoprene and 1,3-butadiene was used as the monomers. The GC analysis of the residual monomer contained in the polymerization mixture indicated that 90% of isoprene was consumed after 276 minutes at 90° C. The polymerization was continued for an additional 30 minutes. The polymer was then recovered as described in Example 3. The resulting polymer had a Tg at −102° C. It was also determined to have a Mooney viscosity (ML-4) at 100° C. of 103. The GPC measurements indicated that the polymer has a number average molecular weight (Mn) of 417,000 and a weight average molecular weight (Mw) of 1,021,000. The polydispersity (Mw/Mn) of the resulting polymer is 2.44. A rate and polymer characteristics comparison of the IBRs prepared using Nd catalysts described in Examples 1 and 2 are tabulated in Table 2.

TABLE 2

| Example No | Catalyst | Time to 90% conversion (min.) | Tg (° C.) | ML-4 | Molecular weight by GPC Mn | Mw | Mw/Mn |
|---|---|---|---|---|---|---|---|
| 5 | Preformed Nd with t-AmCl | 9 | −102 | 102 | 427K | 1,029K | 2.41 |
| 6 | Pre-alkylated Nd with t-AmCl added separately | 276 | −102 | 103 | 417K | 1,021K | 2.48 |

EXAMPLES 7–8

In these examples, polyisoprenes are prepared using a preformed Nd catalyst as described in Example 2. The molar ratio of Nd to TOA and to t-AmCl was 1:14:2. The procedure described in Example 3 was utilized in these examples except that the polymerization temperature was changed to 60° C. and 40° C., respectively. The time needed for 90% monomer conversion, Tg and ML-4 of the resulting polyisoprenes are listed in Table 3.

TABLE 3

| Example No. | Nd/TOA/t-AmCl Ratio | Polymerization Temperature (° C.) | Time to 90% Conversion (min.) | Tg (° C.) | ML-4 |
|---|---|---|---|---|---|
| 3 | 1/14/2 | 90 | 14 | −67 | 82 |
| 7 | 1/14/2 | 60 | 21 | −67 | 86 |
| 8 | 1/14/2 | 40 | 80 | −67 | 95 |

EXAMPLES 9–11

In these examples, polyisoprenes were prepared using a preformed Nd catalyst as described in Example 2. However, the molar ratio of Nd to TOA and to t-AmCl was changed to 1:10:2. The procedure described in Example 3 was utilized in these examples and the polymerizations were conducted at 90° C., 75° C., and 60° C. The time needed to attain 90 percent monomer conversion, Tg, and ML-4 of the resulting polyisoprenes are listed in Table 4.

TABLE 4

| Example No. | Nd/TOA/t-AmCl Ratio | Polymerization Temperature (° C.) | Time to 90% Conversion (min.) | Tg (° C.) | ML-4 |
|---|---|---|---|---|---|
| 9 | 1/10/2 | 90 | 12 | −67 | 82 |
| 10 | 1/10/2 | 75 | 23 | −67 | 87 |
| 11 | 1/10/2 | 60 | 60 | −67 | 91 |

EXAMPLES 12–14

In these examples, polyisoprenes are prepared using a preformed Nd catalyst as described in Example 2. However, the molar ratio of Nd to TOA and to t-AmCl was changed to 1:20:2. The procedure described in Example 3 was utilized in these examples and the polymerization were conducted at 90° C., 75° C., and 60° C. The time needed for 90% monomer conversion, Tg, and ML-4 of the resulting polyisoprenes are listed in Table 5.

TABLE 5

| Example No. | Nd/TOA/t-AmCl Ratio | Polymerization Temperature (° C.) | Time to 90% Conversion (min.) | Tg (° C.) | ML-4 |
|---|---|---|---|---|---|
| 12 | 1/20/2 | 90 | 17 | −67 | 53 |
| 13 | 1/20/2 | 75 | 23 | −67 | 77 |
| 14 | 1/20/2 | 60 | 60 | −67 | 90 |

EXAMPLES 15–17

In these examples, polyisoprenes are prepared using a preformed Nd catalyst as described in Example 2. However, the molar ratio of Nd to TOA and to t-AmCl was changed to 1:30:2. The procedure described in Example 3 was utilized in these examples and the polymerization were conducted at 90° C., 75° C., and 60° C. The time needed for 90% monomer conversion, Tg and ML-4 of the resulting polyisoprenes are listed in Table 6.

TABLE 6

| Example No. | Nd/TOA/t-AmCl Ratio | Polymerization Temperature (° C.) | Time to 90% Conversion (min.) | Tg (° C.) | ML-4 |
|---|---|---|---|---|---|
| 15 | 1/30/2 | 90 | 20 | −67 | 40 |
| 16 | 1/30/2 | 75 | 26 | −67 | 51 |
| 17 | 1/30/2 | 60 | 80 | −67 | 77 |

EXAMPLE 18

In this example, a chlorine in hexane solution was prepared. In the procedure used, 1,500 grams of dried hexane was added to a one-gallon (3.8 liter) nitrogen filled pressurized stainless steel cylinder. The cylinder was cooled in an ice bath. Then, 80.7 grams of chlorine gas was added to the cylinder. The concentration of chlorine in hexane was 0.5 M. As estimated using the Raoult's law, the chlorine was fairly soluble in the organic solvent. The estimated chlorine solubility (weight percent) in hexane is shown in Table 7.

TABLE 7

Estimated Chlorine Solubility in n-Hexane, Weight %

| Pressure (psia) | Temperature, °F. | | | | |
|---|---|---|---|---|---|
| | 60 | 70 | 80 | 90 | 100 |
| 14.7 | 11.6 | 9.7 | 8.0 | 6.6 | 5.3 |
| 25 | 21.5 | 18.2 | 15.4 | 13.1 | 11.1 |
| 35 | 31.6 | 26.8 | 22.9 | 19.6 | 16.8 |

EXAMPLE 19

In this example, a polyisoprene rubber was prepared. The procedure described in Example 3 was utilized in this experiment except that chlorine was used as the chloride source and the polymerization temperature was 70° C. The chlorine in hexane solution was prepared by bubbling chlorine gas in to hexane solution. The molarity of chlorine was 1.06 M. GC analysis of the residual monomer indicated that 90% of isoprene was consumed after 2.5 hours. The polymerization was continued for an additional 30 minutes. The polymer was recovered as described in Example 3. The resulting polymer had a Tg at −67° C. It was also determined to have a Mooney viscosity (ML-4) at 100° C. of 74. The GPC measurements indicated that the polymer has a number average molecular weight (Mn) of 550,000 and a weight average molecular weight (Mw) of 1,090,000. The polydispersity (Mw/Mn) of the resulting polymer was 1.98.

EXAMPLE 20

In this example, a polyisoprene was prepared. The procedure described in Example 18 was utilized in this experiment except that only a half amount of chlorine was used. The molar ratio of Nd to TOA and to chlorine was 1:14:1. GC analysis of the residual monomer indicated that 98% of isoprene was consumed after 45 minutes. The polymer was recovered as described in Example 3. The resulting polymer had a Tg at −67° C. The GPC measurements indicated that the polymer has a number average molecular weight (Mn) of 1,000,000 and a weight average molecular weight (Mw) of 1,700,000. The polydispersity (Mw/Mn) of the resulting polymer was 1.70.

EXAMPLE 21

A higher molecular weight polyisoprene was prepared in this example. The procedure described in Example 18 was used in this example except the polymerization temperature and catalyst concentration was changed to 40° C. and 0.065 mmoles/100 g of monomer, respectively.

The resulting polymer had a Tg at −67° C. It was also determined to have a Mooney viscosity (ML-4) at 100° C. of 94. GC analysis of residual monomer indicated that 90 percent of isoprene was consumed in 7 hours. The polymerization was continued for an additional hour and the polymer was recovered as described in Example 3. The GPC measurements indicated that the polymer has a number average molecular weight (Mn) of 1,428,000 and a weight average molecular weight (Mw) of 2,358,000. The polydispersity (Mw/Mn) of the resulting polymer was 1.75. The polymer was also determined to have a microstructure containing 98.1 percent cis-1,4-polyisoprene units, 1.8 percent of 3,4-polyisoprene units, and 0.1 percent trans-1,4 polyisoprene units. NMR also determined that this polyisoprene has very high stereo regularity since it contained only 0.2 percent of head-to-head and 0.2 percent of tail-to-tail structures.

EXAMPLE 22

A higher molecular weight polyisoprene was prepared in this example. The procedure described in Example 19 was used in this example except the polymerization temperature and catalyst concentration was changed to 40° C. and 0.065 mmoles/100 g of monomer, respectively. The molar ratio of Nd to TOA and to chlorine was 1:14:1. GC analysis of the residual monomer indicated that 94 percent of isoprene was consumed after 4 hours. The polymerization was continued for an additional hour and the polymer was recovered as described in Example 3. The resulting polymer has a Tg at −67° C. The GPC measurements indicated that the polymer has a number average molecular weight (Mn) of 1,420,000 and a weight average molecular weight (Mw) of 2,420,000. The polydispersity (Mw/Mn) of the resulting polymer was 1.70.

EXAMPLE 23

A polyisoprene was prepared in this example. The procedure described in Example 18 was used in this example except that the iodine monochloride was used as the halogen source. The resulting polymer had a Tg at −67° C. It was also determined to have a Mooney viscosity (ML-4) at 100° C. of 74. The GPC measurements indicated that the polymer has a number average molecular weight (Mn) of 597,000 and a weight average molecular weight (Mw) of 1,310,000. The polydispersity (Mw/Mn) of the resulting polymer is 2.19.

EXAMPLE 24

A polyisoprene was prepared in this example. The procedure described in Example 3 was used in this example except that the iodine was used as the halogen source. The resulting polymer had a Tg at −66° C. GC analysis indicated that all of the isoprene was converted in 2.5 hours.

EXAMPLE 25

A polybutadiene was prepared in this example. The procedure described in Example 18 was used in this example except that the 1,3-butadiene was used as the monomer. GC analysis indicated that all butadiene was converted in 1 hour. The resulting polymer had a Tg at −111° C. and a Tm at −15° C. It was also determined to have a Mooney viscosity (ML-4) at 100° C. of 23. The GPC measurements indicated that the polymer had a number average molecular weight (Mn) of 144,000 and a weight average molecular weight (Mw) of 332,000. The polydispersity (Mw/Mn) of the resulting polymer was 2.31.

EXAMPLE 26

In this example, a polyisoprene was prepared. The procedure described in Example 3 was utilized in this experiment except that iodine monochloride (ICl) was used as the halide source and the polymerization temperature was 70° C. The molar ratio of Nd to TOA and to ICl was 1:14:2. GC analysis of the residual monomer indicated that 90% of isoprene was consumed after 2.5 hours. The polymerization was continued for an additional 60 minutes. The polymer was recovered as described in Example 3. The resulting polymer has a Tg at −66° C. It was also determined to have a Mooney viscosity (ML-4) at 100° C. of 82. The GPC measurements indicated that the polymer has a number average molecular weight (Mn) of 597,000 and a weight average molecular weight (Mw) of 1,310,000. The polydispersity (Mw/Mn) of the resulting polymer was 2.19.

EXAMPLE 27

A neodymium polyisoprene made in Example 20 (Nd-PI), a nature rubber (NR), a polyisoprene made with a titanium catalyst (Ti-PI) and Purforma® polyisoprene were pressed into rubber sheets at 100° C. in a mold for 15 minutes under 25 ton pressure. After degassing, the rubber sheets were cooled overnight under pressure and cut into standard dumbbells according to ASTM D412 method. The samples were tested in an UTS STM-1E machine at a rate of 50.8 mm/minute at room temperature. The thickness were measured at different positions and averaged for stress calculations. The width and length of samples were set as 6.36 mm and 25.39 mm, respectively. All samples were very carefully loaded without introducing any pre-stress. All tests were conducted until failure of samples, and the breaking areas were always fallen in the designated area (or otherwise the sample would be discarded). The results are reported in Table 7 and shown in the attached graph. It is noticed that the neodymium polyisoprene showed significant necking and much higher elongation at break. The difference in the observed stress-strain curves is noticeable both in the shape and in the values.

TABLE 8

|  | Nd-PI | NR | Ti-PI | Purforma ® PI |
|---|---|---|---|---|
| Tensile Strength at Break, MPa | 1.07 | 0.54 | 0.25 | 0.24 |
| Elongation at Break, % | 1288 | 593 | 436 | 997 |
| 50% Modulus, MPa | 0.39 | 0.31 | 0.24 | 0.24 |
| 100% Modulus, MPa | 0.21 | 0.18 | 0.13 | 0.13 |

EXAMPLE 28

Comparative rubber samples were prepared with natural rubber, Natsyn® 2200 (synthetic polyisoprene), unmodified Purforma® (neodymium synthetic polyisoprene) and the Cl-modified neodymium synthetic polyisoprene (Example 21). Carbon black was individually added to these polymers using the recipe of Table 9 in a non-productive mix using a lab scale banbury mixer. A second pass banbury mix as indicated in Table 9 was used to add the curatives for obtaining cured rubber samples for testing.

TABLE 9

| Non-Productive Banbury Mix (4 min @160° C.) | |
|---|---|
| Natural Rubber(TSR20 Grade) | 100 |
| Carbon Black (ASTM 299) | 50 |
| Processing Oil (Flexon 641 from ExxonMobil) | 5 |
| Zinc Oxide | 5 |
| Stearic Acid | 2 |
| Antioxidant (Flectol TMQ from Flexsys) | 2 |
| Productive Banbury Mix (2 min @ 110° C.) | |
| Benzothiazyl-2-Tert-butyl sulfenamide | 1 |
| Sulfur | 1.4 |

The results in Table 10 compare the cured properties of natural rubber with the various synthetic polyisoprenes. Samples for testing were cured 32 min at 150° C. Rheometer was run at 150° C. Hot rebound is at 100° C. test temperature. Strebler tear is a peel adhesion tear test which is conducted at 95° C. The green strength results for NR and the new Cl-modified neodymium polyisoprene are equivalent. The green strength value represents the stress required to stretch an uncured rubber compound to an elongation of 120%. Higher values are considered better for tire component applications. The Natsyn® 2200 synthetic polyisoprene and the unmodified neodymium polyisoprenes have low green strength values. The 300% modulus values from stress strain testing and hot rebound values are fairly equivalent for all rubber compounds in this series. Low strain stiffness as measured by dynamic viscoelastic testing at 60° C., show somewhat higher values for the synthetic polyisoprenes. Tan delta values, which are a measure of a compound hysteresis (lower is better), when measured at 60° C. are also slightly lower for the synthetic polyisoprenes. Unexpectedly, the tear strength values for the Cl-modified neodymium polyisoprene are far superior to the other synthetic polyisoprenes and approach the tear strength of natural rubber. At the 50/50 blend ratio of synthetic polymer and natural rubber, which is shown in parentheses, the Cl-modified polyisoprene is again, surprisingly far superior to the other synthetic polyisoprenes. DIN abrasion which is a measurement of compound abradibility shows fairly equivalent values for all compounds. Tack strength for the Cl-modified Neodymium polyisoprene is clearly superior to the other synthetic polyisoprenes and somewhat comparable to natural rubber. Tack is very critical for building tire components, one on top of each other prior to the curing of a tire.

These lab properties clearly indicate the unexpected performance of this new novel polymer when evaluated in a tire tread type application. The improvement of tack and green strength of uncured rubber compounds and the dramatic improvement in cured compound tear strength is truly unique.

TABLE 10

| Polymers | NR | Natsyn | Purforma ® Nd PI | CL Mod Nd PI |
|---|---|---|---|---|
| Mooney | 66 | 77 | 81 | 92 |
| Green Str (120%) | .47 | .28 | .33 | .42 |
| RheometerT90 | 13 | 12.8 | 16.6 | 17.8 |
| 300% Modulus | 12.6 | 11.2 | 11.3 | 10.4 |
| Hot Rebound | 60 | 61 | 61 | 61 |
| G' @ 10% | 1270 | 1436 | 1434 | 1356 |
| TD @ 10% | .103 | .095 | .090 | .098 |
| Strebler Tear | 176 | 128 | 115 | 152 |
|  |  | (157) | (139) | (172) |
| Instron Tear | 435 | 418 | 411 | 627 |
| DIN Abrasion | 125 | 120 | 130 | 126 |
| Tack | 16.9 | 9.5 | 9.3 | 14.4 |

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a neodymium catalyst system which consists of (1) reacting a neodymium carboxylate with an organoaluminum compound in an organic solvent to produce neodymium-aluminum catalyst component, and (2) subsequently reacting the neodymium-aluminum catalyst component with an elemental halogen to produce the neodymium catalyst system.

2. A process as specified in claim 1 wherein the elemental halide is fluorine.

3. A process as specified in claim 1 wherein the elemental halide is chlorine.

4. A process as specified in claim 1 wherein the elemental halide is bromine.

5. A process as specified in claim 1 wherein the elemental halide is iodine.

6. A process as specified in claim 1 wherein the elemental halide is astatine.

7. A process as specified in claim 1 wherein the neodymium carboxylate is reacted with the organoaluminum compound at a temperature that is within the range of 0° C. to 150° C.

8. A process as specified in claim 1 wherein the molar ratio of the elemental halogen to the neodymium carboxylate is within the range of 0.1:1 to about 5:1.

9. A process as specified in claim 1 wherein the molar ratio of the elemental halogen to the neodymium carboxylate is within the range of 0.5:1 to about 2:1.

10. A process as specified in claim 1 wherein the molar ratio of the elemental halide to the neodymium carboxylate is within the range of 0.3:1 to about 1.5:1.

11. A process as specified in claim 1 wherein the mole ratio of the organoaluminum compound to the neodymium carboxylate is within the range of about 4/1 to about 200/1.

12. A process as specified in claim 1 wherein the organoaluminum compound is selected from the group consisting of trialkylaluminum compounds and dialkylaluminum hydride compounds.

13. A process as specified in claim 1 wherein the mole ratio of the organoaluminum compound to the neodymium carboxylate is within the range of about 10/1 to about 50/1.

14. A process as specified in claim 1 wherein said organoaluminum compound is selected from the group consisting of diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, benzylisopropylaluminum hydride, ethylaluminum dihydride, butylaluminum dihydride, isobutylaluminum dihydride, octylaluminum dihydride, amylaluminum dihydride, trimethylaluminum, triethylaluminum, tri-n-propylaluminum, triisopropylaluminum, tri-n-propylaluminum, triisopropylaluminum, tri-n-butylaluminum, triisobutylaluminum, tripentylaluminum, trihexylaluminum, trioctylaluminum, triphenylaluminum, tri-p-tolyaluminum, tribenylaluminum, ethyldiphenylaluminum, ethyl-di-p-tolylaluminum,, ethyldibenzylaluminum, diethylphenylaluminum, diethyl-p-tolylaluminum, and diethylbenzylaluminum.

15. A process as specified in claim 1 wherein the neodymium carboxylate is selected from the group consisting of neodymium octoate, neodymium neodecanoate, and neodymium 2-ethyl hexanoate.

16. A process as specified in claim 1 wherein the elemental halogen is a mixture of at least 2 Group VII elements.

17. A process as specified in claim 16 wherein the elemental halogen is a mixture of fluorine and chlorine.

* * * * *